United States Patent

[15] 3,689,192

Upmeier

[45] Sept. 5, 1972

[54] MANUFACTURE OF FILM FROM THERMOPLASTIC MATERIAL THAT IS BLOWN BY A BLOWHEAD

[72] Inventor: Hartmut Upmeier, Tecklenburg, Germany

[73] Assignee: Windmoller & Holscher, Westphalia, Germany

[22] Filed: Feb. 23, 1971

[21] Appl. No.: 118,035

[30] Foreign Application Priority Data

March 3, 1970 Germany..........P 20 09 914.3

[52] U.S. Cl................................425/467, 264/209
[51] Int. Cl. .............................................B29d 23/04
[58] Field of Search......425/113, 133, 461, 462, 467, 425/326; 264/176 R, 173, 209

[56] References Cited

UNITED STATES PATENTS

| | | | |
|---|---|---|---|
| 3,026,565 | 3/1962 | Bonner | 425/467 |
| 3,270,371 | 9/1966 | Schiedrum et al. | 425/467 |
| 3,343,215 | 9/1967 | Vinkeloe | 425/467 |
| 3,549,735 | 12/1970 | Moss | 425/326 |

Primary Examiner—J. Spencer Overholser
Assistant Examiner—Michael O. Sutton
Attorney—Fleit, Gipple & Jacobson

[57] ABSTRACT

A blowhead for making tubular plastics film in which a housing including an outer part and an inner part having a large central opening for accommodating equipment that is to project into the tubular film is fitted with a nozzle at one end at which the film is blown. Convoluted distributing passages leading to the nozzle are defined between the outer and inner parts of the housing. A lateral supply passage leads molten plastics material to the convoluted distributing passages and includes a cleavage dividing the supply passage into branch passages. The convoluted distributing passages in the direction of the nozzle gradually decrease in depth. Gaps connect adjacent convolutions of the convoluted distributing passages and these gaps in the direction of the nozzle increase in width so that the plastics material as it flows towards the nozzle is gradually led from a convoluted flow path to an axial flow path. Upon introduction of the plastics material is distributed as part-streams into the branch passages substantially in a plane which is radial of the blowhead axis and one of the branch passages merges with the associated convoluted distributing passage over a substantially U-shaped bend.

3 Claims, 3 Drawing Figures

PATENTED SEP 5 1972 3,689,192
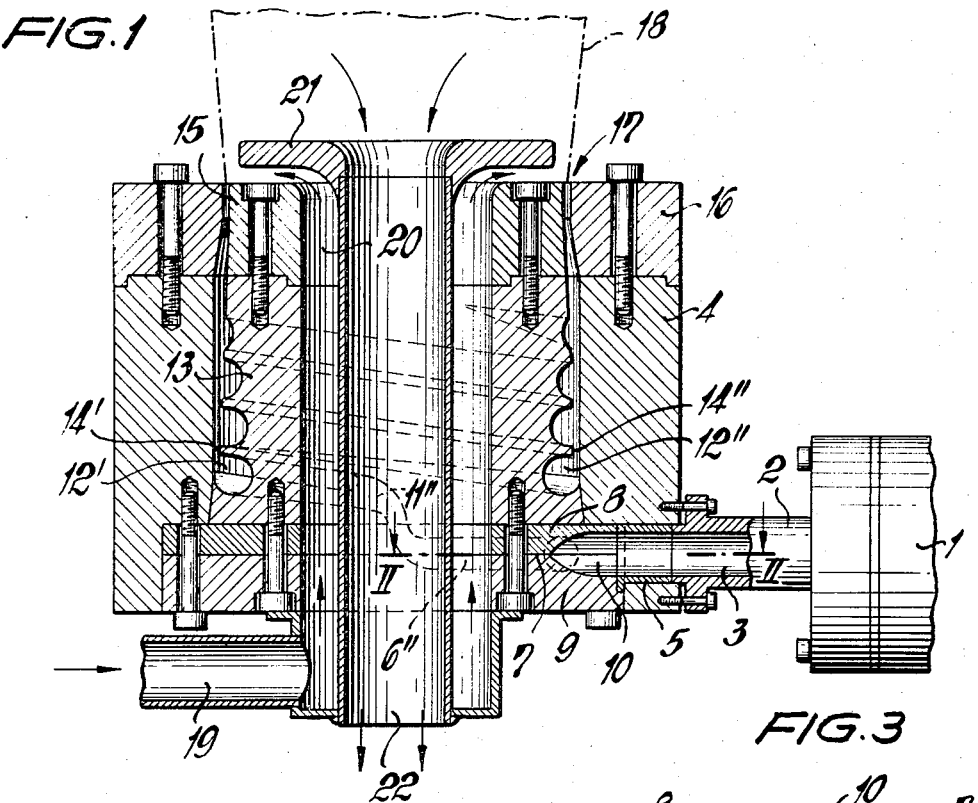
FIG.1
FIG.3
FIG.2
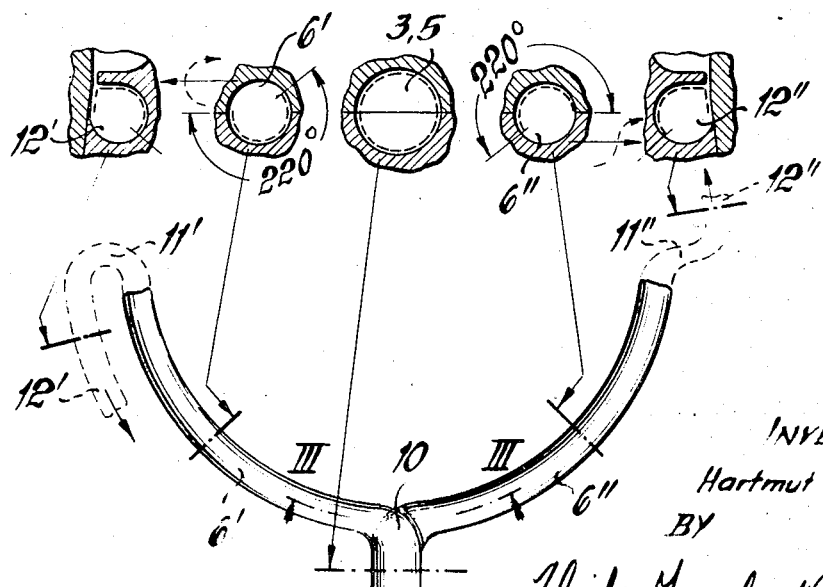
INVENTOR
Hartmut UPMEIER
BY
Fleit, Gipple + Jacobson
his ATTORNEYS

MANUFACTURE OF FILM FROM THERMOPLASTIC MATERIAL THAT IS BLOWN BY A BLOWHEAD

In the manufacture of film from thermoplastic material that is blown by a blowhead, cooling of the film by means of air has proved particularly advantageous because more uniform properties for the film are obtainable than with water cooling. Since the cooling capacity of the air is limited, equipment has been developed by which air cooling can also be performed internally of the blown film. One advantageous apparatus for this has been developed by us, in which the internal cooling air is replaced through the blowhead, the advantage being that in addition to improving the cooling effect any vapors or the like will also be withdrawn from the tubular film so that the film can be produced efficiently at high rates.

Such equipment does, however, call for a blowhead having a large central aperture through which the air conduits necessary for producing a good cooling effect are passed. This large aperture gives rise to problems in designing the flow passages for the molten plastics material because the flow passages must be led around the central opening and then be brought together again, this making it difficult to avoid pronounced flow markings and thus poor tolerances, especially in the case of very high production rates.

One blowhead construction with a large central opening is known, in which the molten material is laterally introduced to a substantially circular distributing passage but in which the pressure drop along the circular passage has proved to be a considerable disadvantage. It has been attempted to neutralize the pressure drop by means of eccentric throttle gaps, the eccentricity referring to the entire circular passage of which the center coincides with the blowhead axis. The eccentric throttle gap diverges with increasing distance from the lateral supply passage, the pressure drop along the circular passage being balanced out as the plastics material leaves in the blowing direction. These eccentric throttle gaps have, however, proved to be strongly dependent on the viscosity of the molten plastics material.

Blowheads are also known which operate on the same principle as extruding heads for sheathing cables, in which the supply passage is bifurcated and the side walls of the passage subsequently extend to two substantially triangularly converging blade edges. In this construction pronounced boundary layers are formed at the blade edges and these extend radially through the entire thickness of the subsequently formed film and give rise to thin portions where the film material is too weak. More refined constructions working on this principle suffer from the same fundamental defects.

In the case of blowheads which do not have a large central opening and where the plastics material is supplied axially, a construction is known comprising several short radial holes which are continued as convoluted passages of which the side walls define gradually diverging gaps together with the housing. The part-streams of plastics material emerging from the convoluted passages become superposed in layers so that flow markings are almost entirely avoided. The combination of these convoluted distributing passages with bifurcated passages in blowheads were the plastics material is introduced laterally has not, however, given satisfactory results because the formation of boundary layers in the bifurcated passages is so pronounced by reason of the length and cross-sectional shape of the bifurcated passages that flow markings and poor tolerances cannot be avoided.

The invention aims to provide a blowhead having a large central opening for installing equipment that projects into the tubular film, the plastics material being supplied laterally of the blowhead and passing through convoluted passages but without giving rise to the aforementioned flow markings.

According to the invention, there is provided a blowhead for making tubular plastics film, comprising a housing having a large central opening for accommodating equipment that is to project into the tubular film, a nozzle at which the film is blown, a lateral supply passage in the housing for molten plastics material, and a cleavage in the supply passage at which the latter is divided into branch passages, wherein the branch passages lead to respective convoluted distributing passages which are open towards the housing and which, by gradually decreasing in depth, define with the housing gaps of increasing width in the direction of plastics flow so that the plastics material is gradually led from a convoluted flow path to an axial flow path, and wherein the plastics material is distributed as part-streams into the branch passages substantially in a plane which is radial of the blowhead axis, the branch passage which receives the part-stream remote from the nozzle merging with the associated convoluted distributing passage over a substantially U-shaped bend.

By dividing the past-streams in a substantially radial plane instead of the hitherto conventional axial plane the boundary layer material in the common supply passage primarily reaches the top of that branch passage which is adjacent the nozzle and primarily the bottom of the branch passage remote from the nozzle. Since the branch passage remote from the nozzle is subsequently diverted along a U-shaped bend, the boundary layer material from the supply passage will in this case also reach the top in the subsequent convoluted distributing passage while the bottom of this distributing passage will contain the fresh material emanating from the center of the supply passage. Accordingly, boundary layer deposits are avoided at the bases of the distributing passages where they would be particularly disadvantageous because the base of each passage is furthest removed from the nozzle orifice than any other part of the cross-section of the passage and it is here that the plastics flow would stagnate. By introducing fresh material at those portions of the passage where boundary layers might be deposited, the preceding material is driven out and prevented from remaining in the passages for prolonged periods. This is particularly important when the color of the plastics material is changed.

The supply passage and preferably two branch passages may be defined by channels of substantially semi-circular cross-section in the confronting faces of two superposed plates. At the cleavage, where the supply passage is divided into the branch passages, the channels can be led in opposite directions without a dividing wall. It has been found that by simply leading the upper half of the passage past the lower half one will obtain the desired clear separation of the supplied plastics material without any blade being provided for dividing up the plastics flow. By constructing the cleavage as just described, the axis of symmetry of each part-stream is turned laterally through about 20° as is desired. This is because each part-stream travels through a curve of almost 90° at the cleavage. Naturally, the flow of material is stronger at the periphery of the curve, i.e. at the outside, than at the inside of the curve. Since the part-streams from the cleavage, where each part-stream travels only above or only below the confronting faces of the two superposed plates, is subsequently diverted either downwardly or upwardly into the respective branch passages of which one half is formed in each of the confronting faces of the superposed plates, the stronger flow at one side of each steam will cause the right-hand steam to be turned to the left and the left-hand steam to be turned to the right. In addition, the bases of the convoluted distributing passages will be supplied only with fresh plastics material emanating from the center of the supply passage.

The convoluted distributing passages are preferably of substantially 270° sector cross-section at their closed starting portions up to the start of the gaps and the branch passages are preferably of substantially circular cross-section. This three-quarter-circular cross-section at the start of the convoluted distributing passages improves the flow of fresh material along those walls of the helical distributing passages where boundary layer deposits are most likely to occur, namely the angle between the wall portion of circular cross-section and the straight wall portion formed by the housing.

An example of the invention is illustrated in the accompanying diagrammatic drawings, wherein:

FIG. 1 is a longitudinal section of a blowhead with built-in internal cooling equipment for the tubular film;

FIG. 2 is a composite view showing a portion of branch passages from the supply passage of the FIG. 1 apparatus viewed substantially on the line II—II in FIG. 1 and various cross-sections which are taken at the positions marked by respective arrows and which indicate the disposition of the boundary layer of the plastics material, and FIG. 3 is a fragmentary section taken on the line III—III in FIG. 2 illustrating how the main stream of plastics material from the supply passage is divided to flow into the branch passages.

Molten plastics material delivered by an extruder 1 is fed through a connector 2 to a supply passage 3 entering sideways through a blowhead housing 4. A sealing sleeve 5 guides the molten material to branch passages 6', 6". These branch passages are preferably formed in the confronting faces 7 of two superposed plates 8, 9 so that the passages 6', 6" are of circular cross-section, which is beneficial for good flow characteristics. The lower half of the stream of plastics material from the supply passage 3 is fed to the branch passage 6' and the upper half to the branch passage 6". The cleavage where the supply passage becomes bifurcated is indicated at 10. The supply passage 3 is of circular cross-section and formed by substantially semi-circular channels in the confronting faces 7 of the plates 8 and 9. As best shown in FIG. 3, these channels are simply led in opposite directions to merge with the branch passages 6', 6". Thus, the stream of molten material in the supply passage 3 is sub-divided without any dividing blade simply by leading the upper half of the passage past the lower half radially of the blowhead axis, which is the direction in which a film 18 is blown. The peripheral angle of 220° of the boundary layer in each of the branch passages 6', 6" (see the appropriate cross-sections in FIG. 2) or rather the remaining angle of 140° in which only fresh plastics material is located along the walls of the branch passages is found by calculation as well as by experiment to be proportional to half the periphery of the supply passage 3 and the radial length of the horizontal parting surface of the part-streams, the desired lateral twisting of the axis of symmetry about 20° being achieved by appropriate formation of the cleavage 10.

The part-streams of plastics material leaving the branch passages 6', 6" are led into coiled distributing passages 12', 12" by a U-shaped bend 11' and an S-shaped bend 11", respectively. The resulting dispositions of the boundary layers emanating from the supply passage are indicated in heavy broken lines in the individual cross-sections of FIG. 2. It should be noted that the bends 11', 11" and convoluted distributing passages 12', 12" are shown in broken lines in FIG. 2 as being turned through 90° to one side whereas these bends in reality extend in the axial direction of the blowhead. By turning the branch passage 6' through 180°, the boundary layer in the lower region of the branch passage 6' is transposed to the top in the distributing passage 12' while the boundary layer at the top of the branch passage 6" retains its upper position in the distributing passage 12" because it is only diverted through an S-shaped bend.

It is of particular advantage that the distributing passages 12', 12" formed in an insert 13 of the housing are not semi-circular from where they start at the ends of the bends 11', 11" up to the positions 14', 14" where overflow commences. Instead, the distributing passages here have a substantially 270° sector cross-section. If, as would be natural, one were to use an end mill cutter to form the convoluted passages 12', 12" in the housing insert 13, which would result in a semi-circular or U-shaped cross-section, a pronounced corner would be formed between the base of each passage and the adjacent inner surface of the housing. This corner would act as a trap for the plastics material and part of the boundary layer would be deposited at this location. By reason of a cross-section which is three-quarters of a complete circle and by reason of leading fresh plastics material from the center of the supply passage 3, disadvantageous boundary layer deposits are avoided at the base of the passages 12', 12" up to the overflow positions 14', 14", thereby substantially preventing the formation of flow marks and thin portions in the blown film.

After the flow of the plastics material has been converted from a convoluted path to an axial path by gradually penetrating through the diverging slots or gaps between the side walls of the passages 12', 12" and the inner face of the housing, the plastics is blown as the tubular film 18 through a nozzle orifice 17 in the diagrammatically illustrated nozzle rings 15, 16. The blown film is cooled, hauled off and wound up. The particularly advantageous internal cooling of the film which simultaneously effects cooling of the nozzle ring 15 is brought about by air entering through a pipe 19 and an annular passage 20 past a guide ring 21 and leaving through an outlet pipe 22.

For a better understanding of the drawings, the latter have been simplified by omitting equipment for heating the blowhead and means for thermally insulating the air passage 20 and pipe 22 because all these details can be carried out in the known manner.

It is by all means possible to provide the branch passages 6', 6'' with further branches which open into a corresponding number of convoluted distributing passages but in that case the decided symmetrical distribution of the boundary layers will no longer be possible.

I claim:

1. A blowhead for making tubular plastics film, comprising a housing including an outer part and an inner part having a large central opening for accommodating equipment that is to project into the tubular film, a nozzle at which the film is blown, convoluted distributing passages leading to the nozzle and being defined between the outer and inner parts of the housing, a lateral supply passage in the housing for leading molten plastics material to the convoluted distributing passages including a cleavage dividing the supply passage into branch passages, which branch passages lead to respective convoluted distributing passages, said convoluted distributing passages in the direction of the nozzle gradually decreasing in depth, gaps defined in the housing between adjacent convolutions of the convoluted distributing passages said gaps in the direction of the nozzle increasing in width so that the plastics material as it flows towards the nozzle is gradually led from a convoluted flow path to an axial flow path, and wherein the plastics material is distributed as part-streams into the branch passages substantially in a plane which is radial of the blowhead axis, one of the branch passages merging with the associated convoluted distributing passage over a substantially U-shaped bend.

2. A blowhead according to claim 1, wherein the supply passage and branch passages are defined by channels of substantially semicircular cross-section in the confronting faces of two superposed plates forming part of the housing, the channels being led to the branch passages in opposite directions at the cleavage without a dividing wall.

3. A blowhead according to claim 1, wherein the convoluted distributing passages are of substantially 270° sector cross-section at their closed portions up to the start of the gaps and the branch passages are of substantially circular cross-section.

* * * * *